(12) United States Patent
Nishimori

(10) Patent No.: US 11,394,088 B2
(45) Date of Patent: Jul. 19, 2022

(54) BATTERY MODULE

(71) Applicant: Vehicle Energy Japan Inc., Hitachinaka (JP)

(72) Inventor: Hitoshi Nishimori, Hitachinaka (JP)

(73) Assignee: Vehicle Energy Japan Inc., Hitachinaka (JP)

(*) Notice: Subject to any disclaimer, the term of this patent is extended or adjusted under 35 U.S.C. 154(b) by 148 days.

(21) Appl. No.: 16/958,414

(22) PCT Filed: Jan. 24, 2019

(86) PCT No.: PCT/JP2019/002177
§ 371 (c)(1),
(2) Date: Jun. 26, 2020

(87) PCT Pub. No.: WO2019/163381
PCT Pub. Date: Aug. 29, 2019

(65) Prior Publication Data
US 2020/0350548 A1 Nov. 5, 2020

(30) Foreign Application Priority Data

Feb. 26, 2018 (JP) .............................. JP2018-031500

(51) Int. Cl.
*H01M 50/502* (2021.01)
*H01M 10/058* (2010.01)
*H01M 50/543* (2021.01)

(52) U.S. Cl.
CPC ....... *H01M 50/502* (2021.01); *H01M 10/058* (2013.01); *H01M 50/543* (2021.01)

(58) Field of Classification Search
None
See application file for complete search history.

(56) References Cited

U.S. PATENT DOCUMENTS

2011/0287299 A1* 11/2011 Kim ..................... H01M 50/20
429/158
2015/0135522 A1 5/2015 Seto et al.
2015/0144409 A1 5/2015 Fujii

FOREIGN PATENT DOCUMENTS

ER    2 390 945 A1   11/2011
WO   WO 2014/024424 A1   2/2014

OTHER PUBLICATIONS

Extended European Search Report issued in European Application No. 19757454.4 dated Oct. 27, 2021 (nine (9) pages).
International Search Report (PCT/ISA/210) issued in PCT Application No. PCT/JP2019/002177 dated May 21, 2019 with English translation (three (3) pages).
Japanese-language Written Opinion (PCT/ISA/237) issued in PCT Application No. PCT/JP2019/002177 dated May 21, 2019 (three (3) pages).

* cited by examiner

*Primary Examiner* — Carmen V Lyles-Irving
(74) *Attorney, Agent, or Firm* — Crowell & Moring LLP

(57) ABSTRACT

A secondary battery module incudes a secondary battery, a secondary battery laminate, a busbar, and one pair of lashing plates. The one pair of lashing plates is provided on either end of the secondary battery laminate in a laminating direction. The one pair of lashing plates is connected via a cell block provided so as to face the narrow surface of the secondary battery. The secondary battery laminate is lashed in a state of being pressed in the laminating direction.

6 Claims, 11 Drawing Sheets

BATTERY MODULE

TECHNICAL FIELD

The present invention relates to a secondary battery module comprising a plurality of secondary batteries 2.

BACKGROUND ART

Conventionally, in the field of rechargeable secondary batteries, aqueous solution-based batteries such as lead batteries, nickel-cadmium batteries, and nickel-hydrogen batteries were prevalent. Nevertheless, pursuant to the advancement of miniaturization and weight-saving of electrical devices, lithium secondary batteries having a high energy density are attracting attention, and the research, development and commercialization thereof have been advanced rapidly.

Meanwhile, in light of problems such as global warming and depletion of fuel, electric vehicles (EV) and hybrid electric vehicles (HEV) in which an electric motor assists a part of the drive train are being developed by various automobile manufacturers, and secondary batteries having a high capacity and a high output are now being demanded as the power source thereof. As a power source that meets the foregoing demand, non-aqueous solution-based lithium secondary batteries having a high voltage are attracting attention. In particular, since square lithium secondary batteries have superior volumetric efficiency when packed, expectations are high for the development of square lithium secondary batteries for use in HEVs or EVs.

When packing a plurality of secondary batteries, a guide member or the like is required for arranging the plurality of secondary batteries so that they do not get out of position.

For example, PTL 1 proposes a secondary battery module in which a plurality of secondary batteries are laminated via an insulating material having a guide wall.

CITATION LIST

Patent Literature

PTL 1: WO2014-024424

SUMMARY OF THE INVENTION

Problems to be Solved by the Invention

When attempting to produce a module structure inexpensively, considered may be replacing the insulating material disclosed in PTL 1 with an inexpensive sheet material. Nevertheless, in the foregoing case, it will be difficult to arrange the secondary batteries without such secondary batteries getting out of position.

Meanwhile, for instance, a plurality of secondary batteries can be arranged by inserting their terminals into the holes of the busbar case disclosed in PTL 1.

Nevertheless, when fixing the secondary batteries in a state of being compressed in the laminating direction, because the size of the secondary battery laminate in the laminating direction will differ before compression and after compression, there is a problem in that the positions of the terminals will change, and it is difficult to dispose the secondary batteries at their fixed positions before compression.

An object of the present invention is to provide a secondary battery module having superior ease of assembly and which enables secondary batteries to be arranged in fixed positions even when the size of a secondary battery laminate in a laminating direction changes before and after compression.

Means to Solve the Problems

A means for solving the foregoing problem is, for example, as follows.

A secondary battery module, comprising: a secondary battery having a wide surface and a narrow surface, and a terminal provided protruding from the narrow surface; a secondary battery laminate in which a plurality of the secondary batteries are laminated so that the wide surfaces are caused to face each other and the terminals are oriented toward one side; and a busbar case provided so as to face a side on which the terminals of the secondary battery laminate are provided, wherein the busbar case has a plurality of holes at positions respectively corresponding to the terminals; the terminals are inserted into the holes; and a length M, which is a sum in the laminating direction, of a gap E, which is a gap on an outside in the laminating direction among gaps between the secondary batteries and inner walls of the holes and which are provided on one end of the secondary batteries in the laminating direction, and a gap F, which is a gap on an outside in the laminating direction among gaps between the secondary batteries and inner walls of the holes which are provided on another end of the secondary batteries in the laminating direction, satisfies Formula (1) below:

$$M > (A-B) \times (N-1) \qquad \text{Formula (1)}$$

(In Formula (1), A is a length from an end of one side of the terminal of the secondary battery, in a state in which the secondary battery laminate has not been pressed, in the laminating direction, to one side of the terminal of the adjacent secondary battery in the laminating direction. B is a length from an end of one side of the terminal of the secondary battery, in a state in which the secondary battery laminate has been pressed from both sides in the laminating direction, in the laminating direction, to one side of the terminal of the adjacent secondary battery in the laminating direction. The relation satisfies A>B. N is the number of the secondary batteries in the laminating direction.)

Moreover, for example, the following production method may be adopted.

A method of producing a secondary battery module, comprising: an arrangement step of arranging a plurality of square secondary batteries, each provided with a terminal in a protruding manner, in a cell holder; and a pressing step of pressing the plurality of secondary batteries in a laminating direction after the arrangement step, wherein, in the arrangement step, the terminals of the second batteries are inserted into holes provided on the busbar case.

Advantageous Effects of the Invention

According to the present invention, it is possible to provide a secondary battery module having superior ease of assembly and which enables secondary batteries to be arranged in fixed positions even when the size of a secondary battery laminate in a laminating direction changes before and after compression.

DESCRIPTION OF EMBODIMENTS

An embodiment of the present invention is now explained with reference to the appended drawings.

Example 1

Figure 1:
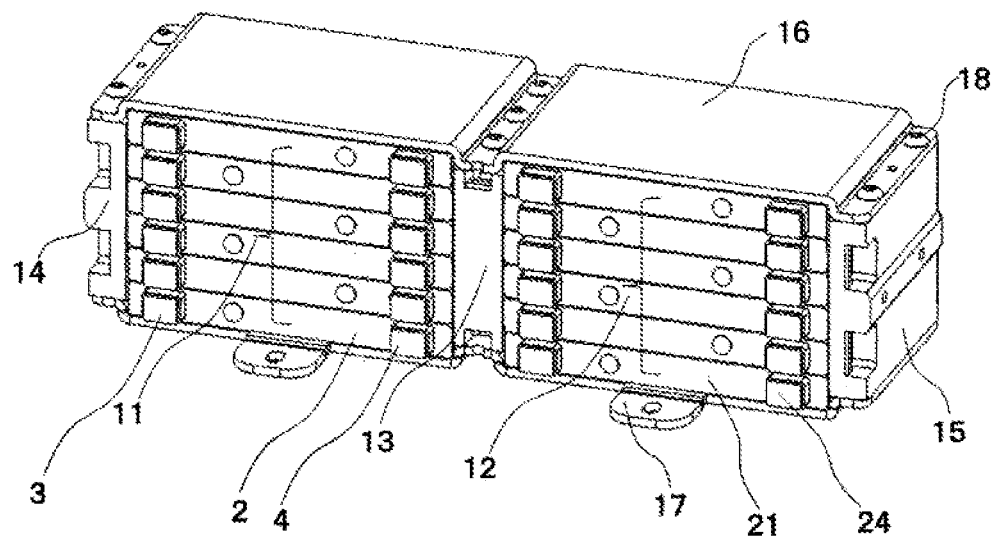
FIG. 1 is an external perspective view of the module excluding the busbar case and the busbars.
Figure 3:
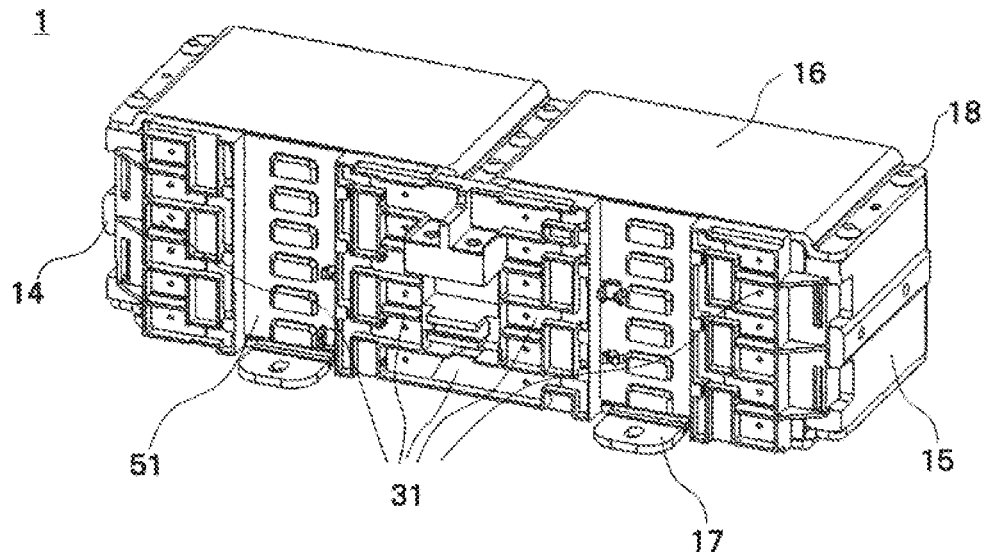
FIG. 3 is an external perspective view of the module including the busbar case and the busbars.

FIG. 1 and FIG. 3 are external perspective views showing an embodiment of the module.

FIG. 1 is an external perspective view of a secondary battery module 1 in a state where a busbar case 51 and busbars 31 have been removed from the secondary battery module 1 shown in FIG. 3.

The secondary battery module 1 comprises a first battery group 11 and a second battery group 12 in which a plurality of secondary batteries are laminated, a first block member 13 disposed between the first battery group 11 and the second battery group 12, and a second block member 14 and a third block member 15 on the end side of the first battery group 11 and the end side of the second battery group 12, and includes an upper lashing plate 16 and a lower lashing plate 17 which collectively lash the first battery group 11 and the second battery group 12. These block members 15 and the upper lashing plate 16 are fixed by being fastened with fastening bolts 18.

The secondary battery 2 has one pair of wide surfaces and two pairs of narrow surfaces, and form the first battery group 11 and the second battery group 12 as a result of the wide surfaces facing each other and being laminated. The narrow surface has a battery case lid, and each battery case lid is provided with a positive terminal 3 and a negative terminal 4 in a protruding state. In the first battery group 11 and the second battery group 12, the positive terminal 3 and the negative terminal 4 are disposed so that they are provided in the same direction.

The first block member 13 is disposed between the first battery group 11 and the second battery group 12, and the second block member 14 and the third block member 15 are disposed on the end side of the first battery group 11 and the end side of the second battery group 12. The upper lashing plate 16 is provided at the end of the secondary battery in the laminating direction, and the lower lashing plate 17 is provided at the other end, and the secondary battery laminate is lashed by being sandwiched with the upper lashing plate 16 and the lower lashing plate 17. The first block member 13, the second block member 14, and the third block member 15 are respectively fastened to the upper lashing plate 16 and the lower lashing plate 17 with the fastening bolts 18. The first block member 13, the second block member 14, and the third block member 15 may be configured, for instance, from metal, resin or other materials. When using metal, a fastening point of the fastening bolt 18 can be formed by threading the metal. When using resin, for example, a fastening point of the fastening bolt 18 can be formed by embedding an insert nut. The upper lashing plate 16 and the lower lashing plate 17 are members for supporting the repulsive force of the battery group, and are preferably formed from metal.

FIG. 3 is an external perspective view of the secondary battery module 1 in a state where the busbar case 51 and the busbars 31 have been mounted on the secondary battery module 1 of FIG. 1.

As described above, the plurality of secondary batteries 2 are disposed such that the positive terminal 3 and the negative terminal 4 face one side, and the positive terminal 3 and the negative terminal 4 are inserted into the terminal insertion holes 53 provided to the busbar case 51. Busbars 31 are provided to the positive terminal 3 and the negative terminal 4 so that the plurality of secondary batteries 2 are connected, for example, via series connection. The busbars 31 are mounted from the busbar case side relative to the positive terminal 3 and the negative terminal 4 inserted into the terminal insertion holes 53.

Figure 2:
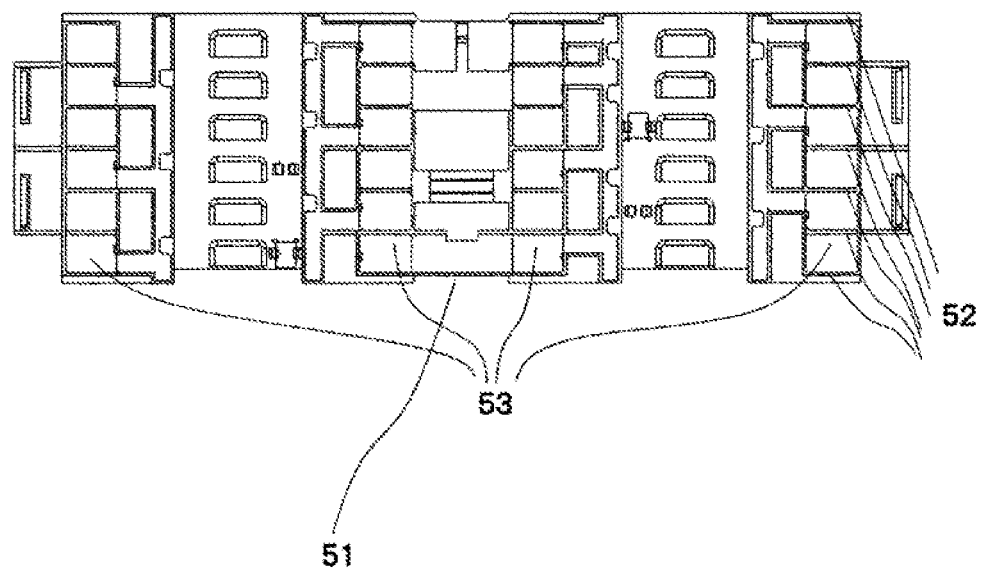
FIG. 2 is a front view of the busbar case in which the partitions are of an equal pitch.

FIG. 2 is a front view of the busbar case 51.

The busbar case 51 includes the terminal insertion holes 53 into which the cell-exterior terminals 24 (positive terminal 3, negative terminal 4) are inserted, and partitions 52 for partitioning the terminal insertion holes 53 from each other. The terminals of the adjacent secondary batteries 2 are insulated from each other with the partitions 52. The busbar case 51 is formed from a material such as polyethylene or other insulating resin. In this example, a total of twenty-four terminal insertion holes 53 (6 rows×4) are provided along the laminating direction of the secondary batteries 2. Moreover, in this example, the length of the terminal insertion holes 53 and the length of the partitions 52 in the laminating direction of the secondary batteries are all the same, and the terminal insertion holes 53 are aligned in an equal pitch.

Figure 4:
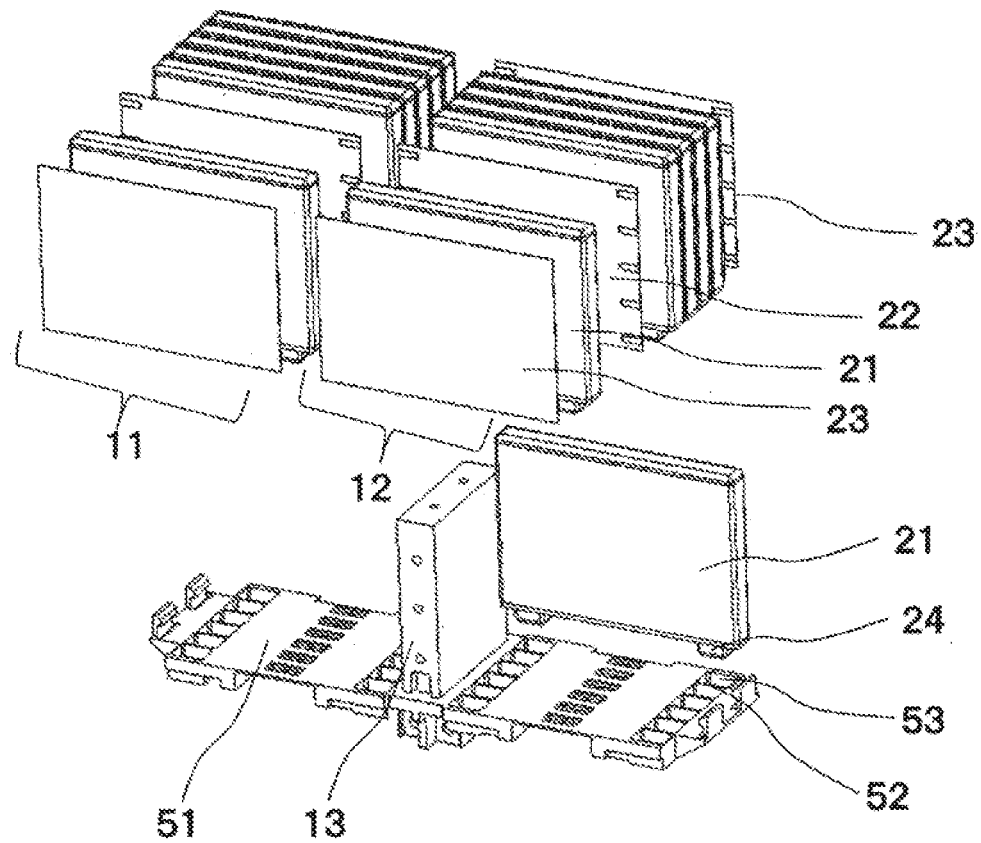
FIG. 4 is a method of assembling the module (first half).
Figure 5:
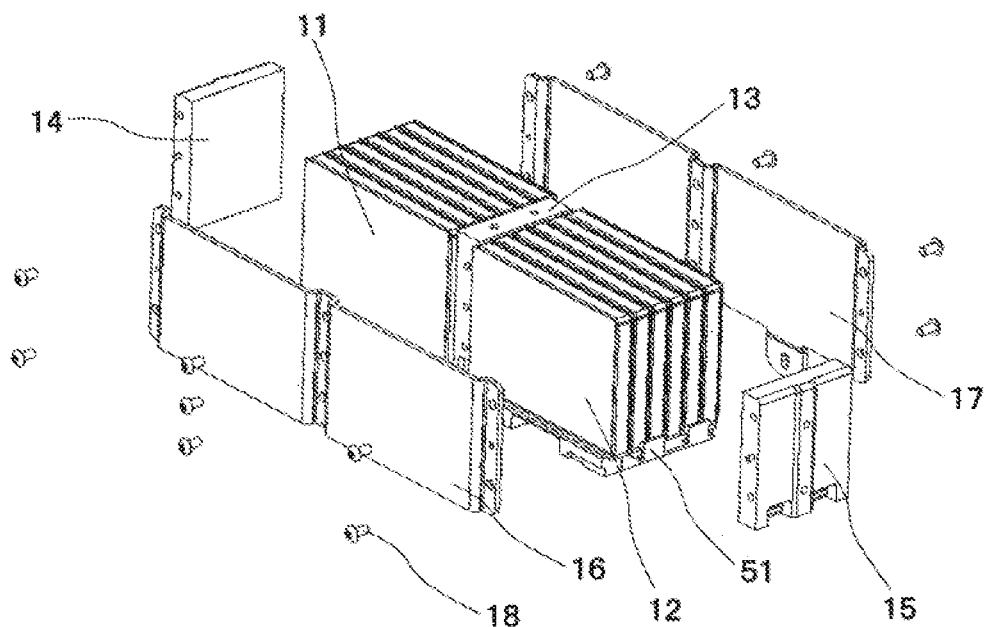
FIG. 5 is a method of assembling the module (second half).

FIG. 4 and FIG. 5 are examples showing the production method of the secondary battery module 1.

FIG. 4 is a diagram showing the arrangement step of arranging the secondary batteries 2 in the busbar case 51.

Foremost, the first block member is fixed to the busbar case 51.

Next, the positive terminal 3 and the negative terminal 4 of the secondary battery 2 are inserted at the outermost terminal insertion holes 53, in the laminating direction, provided to the busbar case 51.

Next, a two-sided protrusive insulating plate 22 comprising protrusions for retaining the secondary battery 2 is disposed on the inside of the inserted secondary battery 2 in the laminating direction.

Subsequently, a separate secondary battery 2 is inserted into the adjacent terminal insertion holes 53 and then a two-sided protrusive insulating plate 22 is disposed on the inside of the inserted separate secondary battery 2 in the laminating direction, and this process is repeated sequentially to form a laminate of the secondary batteries 2.

Thereafter, a one-sided protrusive insulating plate 23 is disposed on either end of the laminate of the secondary batteries 2 in the laminating direction. This process is performed to all terminal insertion holes 53 of the busbar case 51 to form the first battery group 11 and the second battery group 12.

Note that, while in this example the secondary batteries 2 are aligned so that the polarity of the cell-exterior terminals 24 of the adjacent secondary batteries 2 become a reverse polarity, the alignment is not limited thereto depending on the connection of the secondary batteries. Moreover, the two-sided protrusive insulating plate 22 and the one-sided protrusive insulating plate 23 may be formed, for instance, from resin such as PBT (polybutylene terephthalate).

By arranging the secondary batteries 2 by inserting the cell-exterior terminals 24 of the secondary batteries 2 into the terminal insertion holes 53 provided to the busbar case 51, the secondary batteries can be temporarily fixed at their fixed positions before compression of the secondary batteries. When the secondary batteries 2 are arranged in the busbar case 51 without inserting the positive terminal 3 and the negative terminal 4, because there is no positioning mechanism of the secondary batteries 2, it will take much time to arrange the cells at their predetermined positions. However, by using the busbar case 51 in the arrangement of the secondary batteries 2, the time required for arranging the secondary batteries 2 can be shortened, and this will contribute to the improvement in the ease of assembly.

FIG. 5 shows an example of the production method of the secondary battery module 1 up to the fixation of the upper lashing plate 16 and the lower lashing plate 17.

The second block member 14 and the third block member 15 are fixed to the busbar case 51 in the module in progress up to FIG. 4.

The upper lashing plate 16 and the lower lashing plate 17 are caused to come into contact with the first battery group 11 and the second battery group 12, and temporarily fastened with the fastening bolts 18.

A compressive load is applied perpendicularly to the wide surfaces of the upper lashing plate 16 and the lower lashing plate 17, and, when the distance between the upper lashing plate 16 and the lower lashing plate 17 reaches a predetermined length, the fastening bolts 18 are turned at a predetermined torque and fixed.

Subsequently, the busbars 31 for electrically connecting the positive terminal 3 and the negative terminal 4 of the respectively adjacent secondary batteries 2, and external connection busbars for electrically connecting the outside of the secondary battery module 1 and the secondary batteries are disposed on the positive terminal 3 or the negative terminal 4 on the endmost side in the laminating direction, and fixed via laser welding or other methods.

The secondary battery module structure in a case of adopting the production method of forming a module by applying a compressive load to the secondary battery laminate after fixing the positive terminal 3 and the negative terminal 4 in the terminal insertion holes 52 of the busbar case 51 as described above is now explained.

Figure 6:
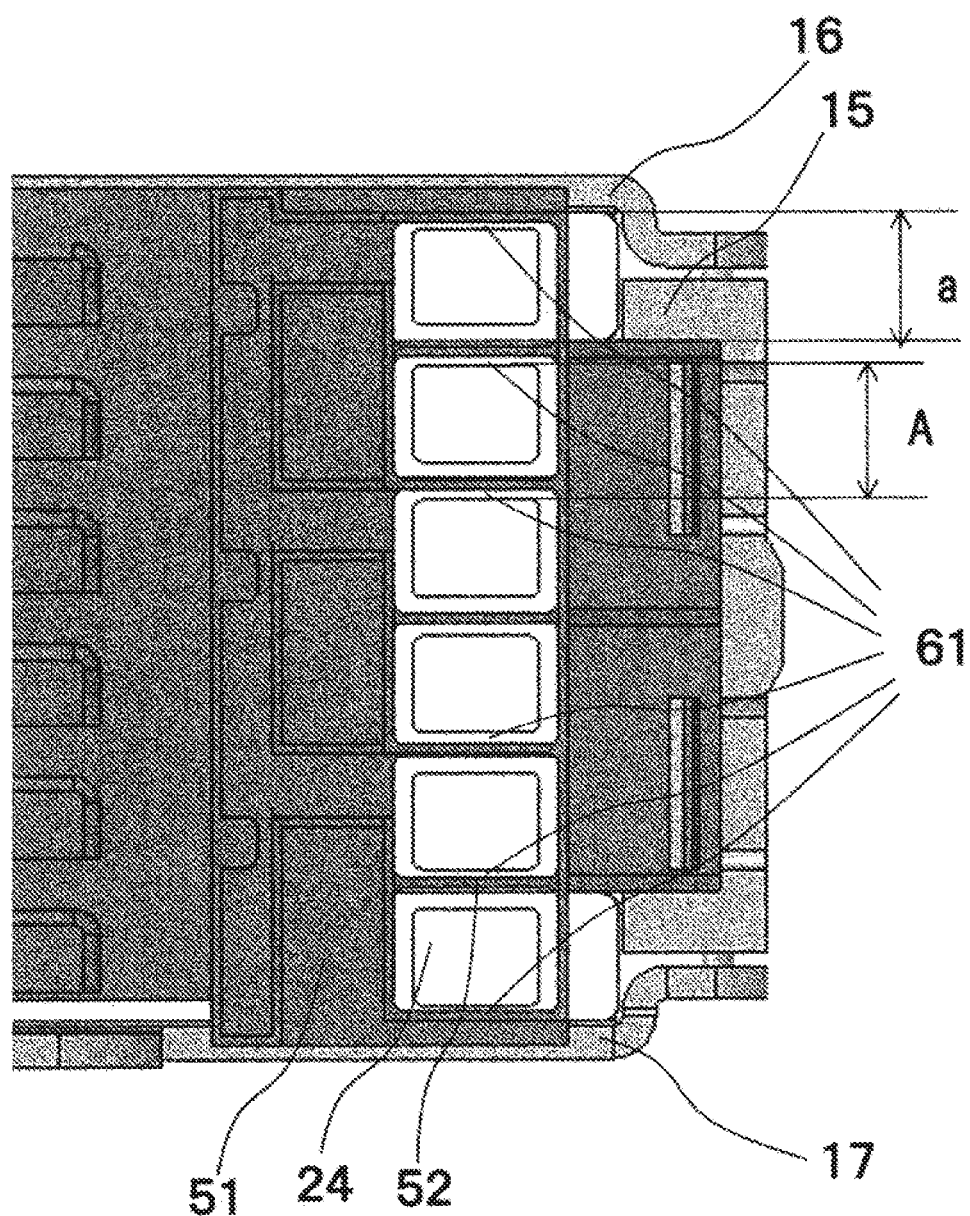
FIG. 6 is a diagram showing a positional relation of the terminals and the busbar case before pressing.

FIG. 6 is a view, seen from the side of the busbar case 51, of the secondary battery module 1 in a state (before compression) in which the positive terminal 3 and the negative terminal 4 of the secondary batteries 2 have been inserted into the terminal insertion holes 53 formed on the busbar case 51, and temporarily fastened with the upper lashing plate 16 and the lower lashing plate 17.

Figure 7:
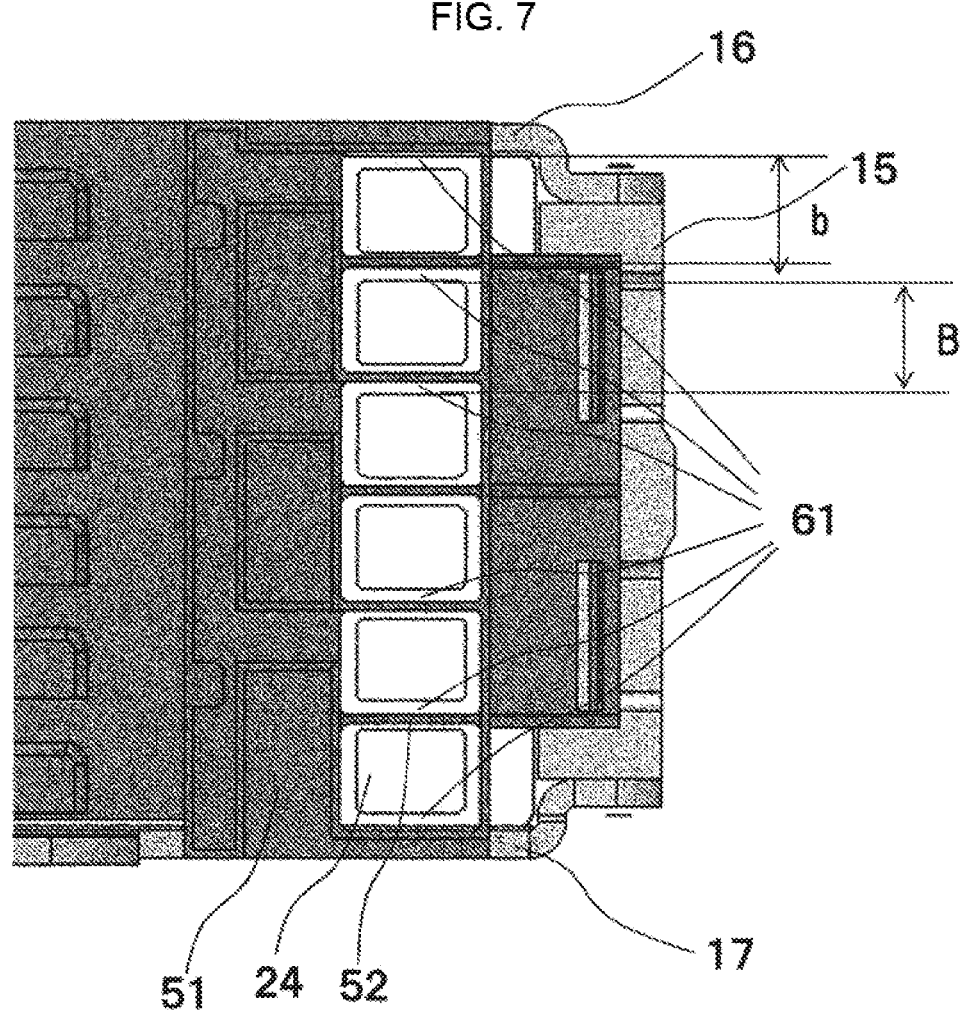
FIG. 7 is a diagram showing a positional relation of the terminals and the busbar case after pressing.

FIG. 7 is a diagram showing the shape of the secondary battery module 1 after pressing the upper lashing plate 16 and the lower lashing plate 17 to a predetermined dimension from the state of FIG. 6, and fastening the upper lashing plate 16 and the lower lashing plate 17 with the fastening bolts 18.

The secondary battery 2 includes a power storage element in which positive electrodes and negative electrodes are laminated in a battery can, and the power storage element becomes expanded and contracted as a result of being charged and discharged. By fixing the secondary battery 2 in a compressed state, the foregoing expansion and contraction can be suppressed, and this will contribute to the maintenance of the performance. When a secondary battery is compressed, the diameter of the secondary battery in the compressing direction will change, and the positional relation of the terminals will also change.

In FIG. 6, the distance (gap 61) between the terminal (positive terminal 3 or negative terminal 4) and the inner wall of the terminal insertion hole 53 in the laminating direction of the secondary battery 2 is different on the outside and the inside of the laminating direction. When paying attention to the distance between the terminal and the inner wall on the outside of the laminating direction, such distance is smaller on the outside of the laminating direction, and becomes greater toward the inside of the laminating direction. When paying attention to the distance between the terminal and the inner wall on the inside of the laminating direction, such distance is greater on the outside of the laminating direction, and becomes smaller toward the inside of the laminating direction.

In FIG. 7, because the secondary batteries have been compressed in the laminating direction, there are differences in the distance between the inner wall and the terminal. When paying attention to the distance (gap 61) between the terminal and the inner wall on the outside of the laminating direction, such distance is greater on the outside of the laminating direction, and becomes smaller toward the inside of the laminating direction. When paying attention to the distance between the terminal and the inner wall on the inside of the laminating direction, such distance is smaller on the outside of the laminating direction, and becomes greater toward the inside of the laminating direction.

The difference between FIG. 6 and FIG. 7 arises as a result of the pitch of the terminals of the adjacent secondary batteries 2 becoming shorter as a result of pressing the secondary batteries in the laminating direction from the state of FIG. 6 to the state of FIG. 7. The pitch from the surface on one side of the terminal of a certain secondary battery 2 in the laminating direction to the surface on one side of the terminal of an adjacent secondary battery in the laminating direction satisfies a relation of A>B when the pitch before compression (FIG. 6) is A, and the pitch after compression is B. Moreover, the change in these pitches A and B is caused by the change in the thickness of the secondary batteries 2 in the laminating direction, and the thickness of the secondary batteries 2 in the laminating direction satisfies a relation of a>b when the thickness before pressing is a, and the thickness after pressing is b.

Here, the pitch a after pressing can be obtained by measuring the pitch of the terminals of the battery group after completion, and the pitch a before pressing can be obtained by measuring the pitch of the terminals in a state where the secondary batteries 2 are in contact at the time of temporary assembly. The thickness of the secondary batteries 2 in the laminating direction can be measured before pressing and after pressing, and A can also be obtained by releasing the pressure once again after pressing.

Since the size of the secondary battery laminate changes before and after pressing as described above, the foregoing production method; that is, the production method of positioning and thereafter pressing the secondary batteries 2 by inserting the cell-exterior terminals 24 of the secondary batteries 2 into the insertion holes 53 of the busbar 51, cannot be adopted unless the positions of the terminal insertion holes of the busbar case 51 are provided by giving consideration to the foregoing fact. When the positions of the terminal insertion holes 53 in the busbar case 51 are decided based on the size after pressing, because the foregoing pitch is large before pressing, it is not possible to position the secondary batteries 2 by inserting the cell-exterior terminals 24 of the secondary batteries 2 into the insertion holes 53 of the busbar case 51.

As a result of the cell-exterior terminals 24 fitting into the terminal insertion holes 53 before and after pressing as shown in FIG. 6 and FIG. 7, it is possible to adopt the foregoing production method having superior ease of assembly. Specifically, a total size M (size obtained by adding the gaps 61 on both ends of the laminating direction) of the gaps on the outside of the laminating direction between the cell-exterior terminals 24 of the secondary batteries and the terminal insertion holes 53 provided on both ends of the laminating direction satisfies Formula (1) below.

$$M > (A-B) \times (N-1) \quad \text{Formula (1)}$$

In Formula (1), A is a length from an end of one side of the terminal of the secondary battery, in a state in which the secondary battery laminate has not been pressed, in the laminating direction, to one side of the terminal of the adjacent secondary battery in the laminating direction (FIGS. 6, 7). B is a length from an end of one side of the terminal of the secondary battery, in a state in which the secondary battery laminate has been pressed from both sides in the laminating direction, in the laminating direction, to one side of the terminal of the adjacent secondary battery in the laminating direction (FIGS. 6, 7). The relation satisfies A>B. N is the number of the secondary batteries in the laminating direction. Here, the pressed state is, for example, a state where the secondary battery laminate is fixed by being enclosed with the cell block, the upper lashing plate, and the lower lashing plate. A non-pressed state is, for example, a state in which the foregoing fixation has been unfixed.

The foregoing production method can be adopted by satisfying Formula (1). The grounds for this are now explained.

Foremost, attention is given to the gaps 61 on the outside of the laminating direction between the terminals of the secondary batteries 2 and the terminal insertion holes 53 provided at the terminus of the laminating direction. Here, calculation is performed on the premise that all cell-exterior terminals 24 in the laminating direction have been inserted into the terminal insertion holes 53 of the busbar case 51 both before pressing and after pressing. The movement of each cell-exterior terminal before and after pressing is calculated. As a result of the secondary battery laminate being pressed, the cell-exterior terminals will become contracted in the laminating direction in an amount of (A−B) for each secondary battery 2. Here, when the center of the laminating direction (in FIGS. 6 and 7, intermediate point of the third cell and the fourth cell from the top of the laminating direction) is deemed an immovable reference point before and after pressing, the cell-exterior terminals 24 of the third cell and the fourth cell near the reference point will move toward the center side in an amount of (A−B)/2. The cell-exterior terminals 24 of the second cell and the fifth cell on the outside thereof will move toward the center side in an amount of (A−B)×3/2. The cell-exterior terminals 24 of the secondary batteries 2 of the first cell and the sixth cell at the terminus of the laminating direction will move toward the center side in an amount of (A−B)×5/2. In other words, the shift of the cell-exterior terminal 24 of the secondary battery 2 at the terminus of the laminating direction is the greatest. Accordingly, the cell-exterior terminal 24 of the terminus secondary battery with the greatest shift being fitted into the terminal insertion hole 53 of the busbar case 51 both before pressing and after pressing is the necessary condition for the cell-exterior terminals 24 of the other secondary batteries being fitted into the terminal insertion holes 53.

Assuming that, before pressing, there is no gap between the outside of the cell-exterior terminals 24 of the terminus secondary battery 2 of the secondary battery laminate in the laminating direction and the partitions 52 of the busbar case 51, since the terminus secondary battery 2 will move toward the center of the laminating direction in an amount of (A−B)×5/2 after pressing, the gap 61 after pressing between the outside of the cell-exterior terminals 24 of the terminus secondary battery 2 in the laminating direction and the partitions 52 of the busbar case 51 will be (A−B)×(5/2).

Similarly, assuming that, before pressing, there is no gap between the outside of the cell-exterior terminals 24 of the terminus secondary battery 2 on the opposite side in the laminating direction and the partitions 52 of the busbar case 51, a gap of (A−B)×(5/2) will arise on the outside of the cell-exterior terminals after pressing. The sum of the gaps on the outside of the terminus secondary batteries 2 on either end will be (A−B)×5.

While the center of the laminating direction was deemed a reference point that does not move before and after pressing in the foregoing explanation, a case of deeming the terminus secondary batteries 2 of the battery group as a reference point that does not move before and after pressing is now explained.

Here, the secondary battery (second cell), which is one cell worth on the center side from the terminus secondary batteries 2, will move toward the center side of the laminating direction in an amount of (A−B). Similarly, the amounts of shift of the third, fourth, fifth and sixth cells will be respectively (A−B)×2, (A−B)×3, (A−B)×4, and (A−B)×5.

Assuming that, before pressing, there is no gap between the outside of the cell-exterior terminal 24 of the terminus secondary batteries 2 (first cell, sixth cell) in the laminating direction and the partitions 52 of the busbar case 51, the gap after pressing between the outside of the cell-exterior terminals 24 of the terminus secondary batteries 2 in the laminating direction and the partitions 52 of the busbar case 51 will be 0 for the first cell and (A−B)×5 for the sixth cell, their sum will be (A−B)×5, and the values will be the same when the location of the reference point that does not move before and after pressing is the center of the battery group. In other words, irrespective of the location of the reference point that does not move before and after pressing, the sum of the gaps after pressing on either end of the module between the outside of the cell-exterior terminal 24 of the terminus cell 21 in the laminating direction and the partitions 52 of the busbar case 51 will be (A−B)×5. Note that the foregoing explanation is a case where the number of cells configuring the battery group is six cells, and, when N cells are used and the sum of the gaps on the outside of the terminus secondary batteries 2 on either end is similarly obtained, the result will be (A−B)×(N−1).

While the foregoing case was a state with no gap before pressing between the outside of the cell-exterior terminals 24 of the terminus secondary batteries 2 and the partitions 52 of the busbar case 51, in a case where there is a gap before pressing, the foregoing gap of (A−B)×(N−1) will be added after pressing in addition to the gap before pressing. In other words, when the module is formed by applying a compressive load to the cell group after fixing the secondary batteries 2 in the terminal insertion holes of the busbar case, the gap between the outside of the cell-exterior terminals of the terminus secondary batteries 2 in the laminating direction and the partitions of the busbar case will be (A−B)×(N−1) or more. Accordingly, by causing the total size M (size obtained by adding the gaps 61 on both ends of the laminating direction) of the gaps on the outside of the laminating direction between the cell-exterior terminals 24 of the secondary batteries and the terminal insertion holes 53 provided on both ends of the laminating direction to be (A−B)×(N−1) or more, the cell-exterior terminals 24 will be fitted into the terminal insertion hole 53 before and after pressing as shown in FIG. 6 and FIG. 7, and realized is a structure which will enable the use of the foregoing production method.

Next, the relation of the gaps 61 between the cell-exterior terminals 24 and the partitions 52 of the busbar case 51 including the secondary batteries 2 other than the terminus secondary batteries 2, is obtained.

With the busbar case 51 shown in FIG. 2, the partitions 52 are arranged in equal intervals, and the size of the respective terminal insertion holes 53 is substantially constant relative to the laminating direction. Here, when the thickness of the partition is C, the relation thereof will be A>C>B. When the gap 61 on the outside of the cell-exterior terminals 24 of the terminus secondary battery 2 after pressing is E, the gap 61 on the outside of the cell-exterior terminals 24 of the secondary battery 2, which is one cell worth on the center side in the laminating direction from the terminus, can be calculated as E−(C−B). Furthermore, the gap 61 of the secondary battery 2 on the inside of the laminating direction will be E−(C−B)×2. With the secondary battery 2 which is N cells worth on the inside of the laminating direction, the foregoing gap 61 will be E−(C−B)×N. In other words, the gap 61 on the outside of the cell-exterior terminals 24 in the laminating direction becomes smaller toward the inside of the laminating direction. Moreover, when the gap 61 on the outside of the cell-exterior terminals 24 of the terminus secondary battery 2 on the opposite side is F, similar to the foregoing argument, the foregoing gap 61 will be F−(C−B)×N when the secondary battery 2 is N cells worth on the inside of the laminating direction.

When using the busbar case 51 having the partitions 52 of an equal pitch as described above, the gaps 61 after pressing on the outside of the laminating direction between the cell-exterior terminals 24 and the partitions 52 will differ depending on the laminating direction, and become smaller by increments toward the center of the laminating direction, and contrarily become greater by increments from the center toward the outside of the laminating direction.

Even when the partitions 52 are provided, by realizing F+E; that, is, by causing M to be (A−B)×(N−1) or more, the cell-exterior terminals 24 can be fitted into the terminal insertion holes 53 both before and after pressing as shown in FIG. 6 and FIG. 7, and realized is a structure which will enable the use of the foregoing production method.

Example 2

While the size and interval of the terminal insertion holes 53 in the laminating direction were caused to be constant in Example 1, the size and interval of the terminal insertion holes 53 in the laminating direction are caused to be unequal in Example 2.

Figure 8:
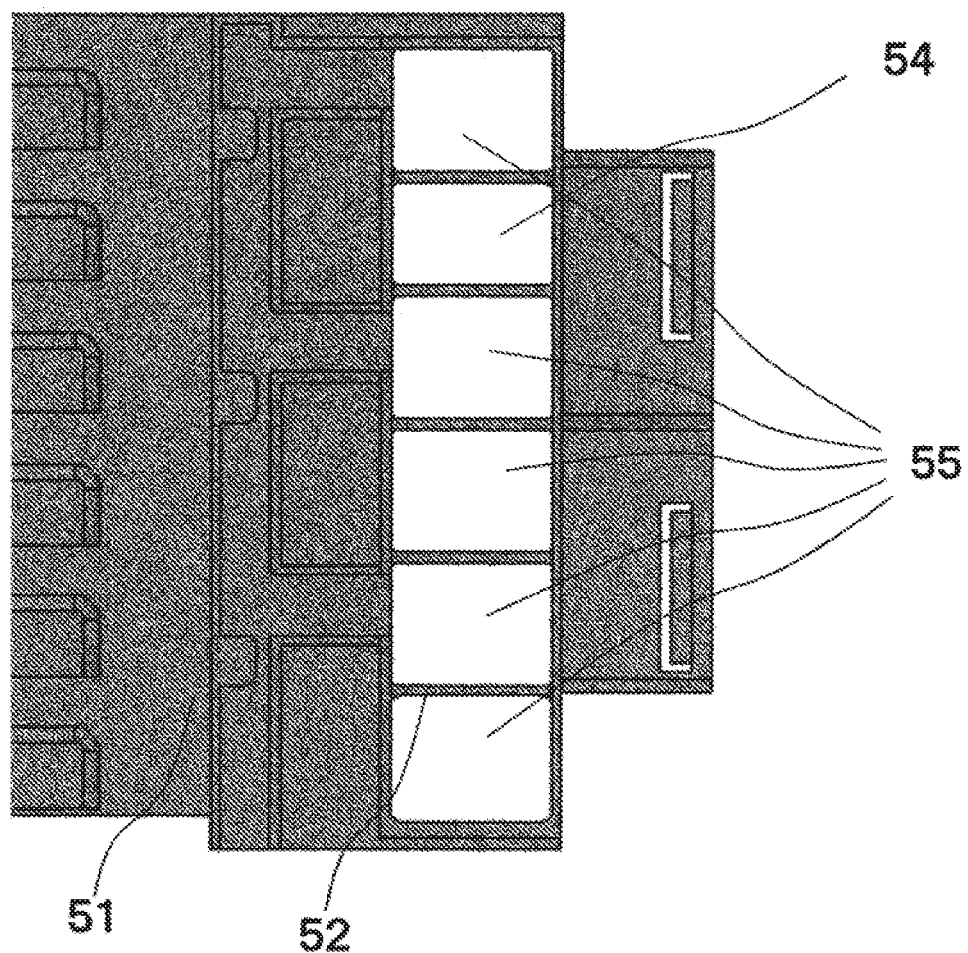
FIG. 8 is a front view of the busbar case in which the partitions are of an unequal pitch.

FIG. 8 is a diagram showing the busbar case 51 in Example 2. One terminal insertion hole 53 among the six terminal insertion holes 53 provided in the laminating direction is narrow, and configures a narrow terminal insertion hole 54. The other terminal insertion holes 53 are wide terminal insertion holes 55 having the same length in the laminating direction. The length of the narrow terminal insertion hole 54 in the laminating direction is roughly the same as the length of the cell-exterior terminals 24 in the laminating direction, and is slightly large so that that the terminal can be inserted easily.

Figure 9:
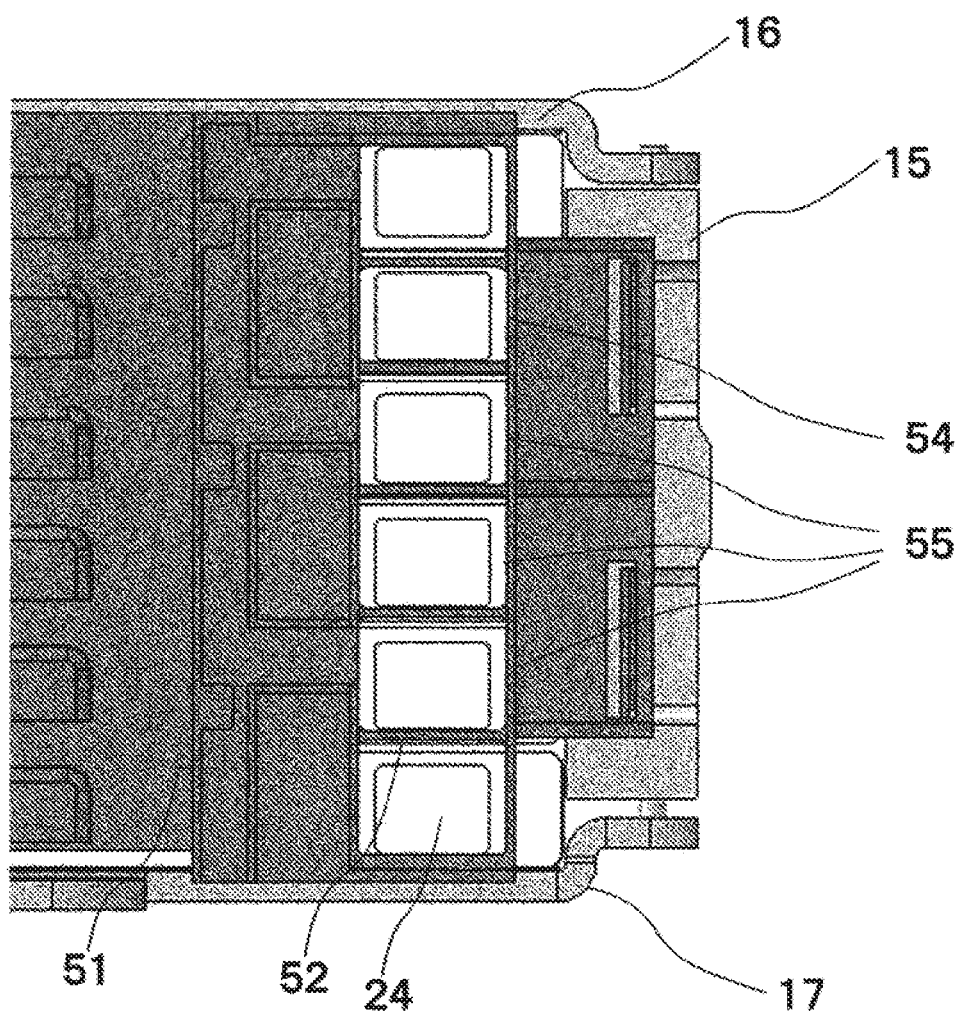
FIG. 9 is a diagram showing a positional relation of the terminals and the busbar case before pressing.

FIG. 9 is a view, seen from the side of the busbar case 51, of the secondary battery module 1 in a state (before pressing of the secondary batteries) in which the cell-exterior terminals 24 of the secondary batteries 2 have been inserted into the narrow terminal insertion hole 54 and the wide terminal insertion holes 55 formed on the busbar case 51 of FIG. 8, and temporarily fastened with the upper lashing plate 16 and the lower lashing plate 17.

Figure 10:
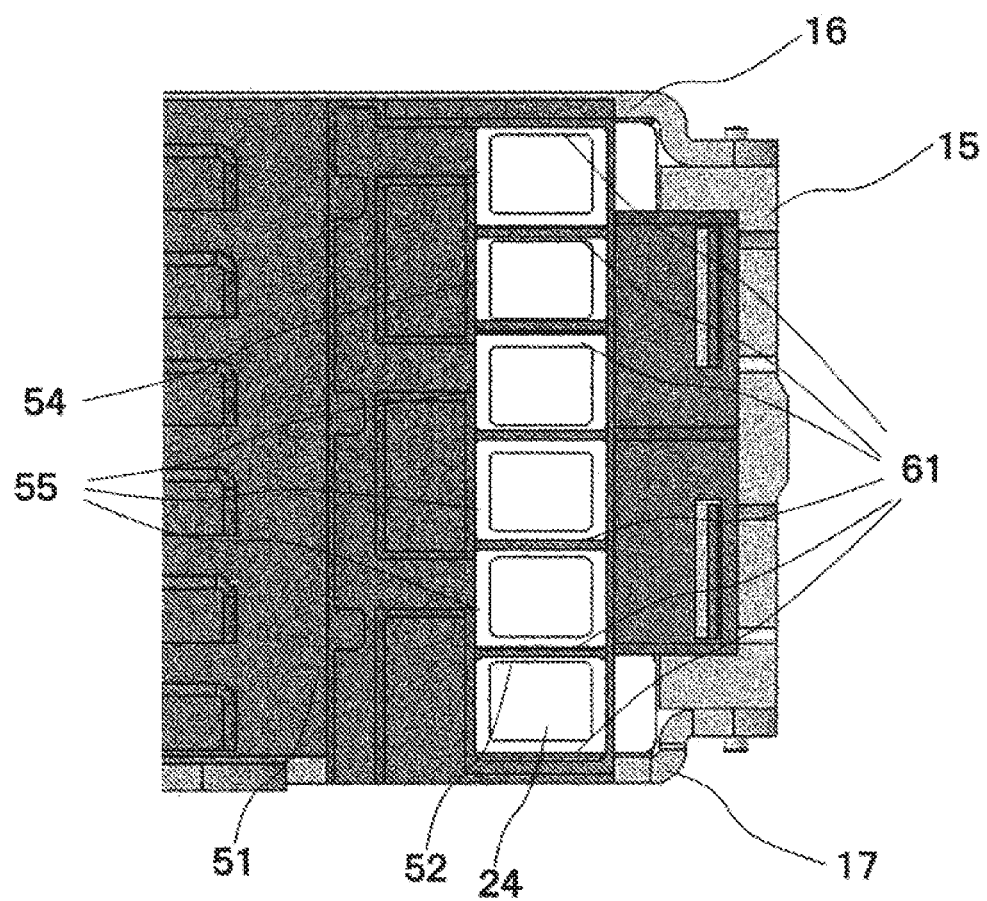
FIG. 10 is a diagram showing a positional relation of the terminals and the busbar case after pressing.

FIG. 10 is a view, seen from the side of the busbar case 51, of the module in a state in which the cell-exterior terminals 24 of the secondary batteries 2 have been inserted into the narrow terminal insertion hole 54 and the wide terminal insertion holes 55 formed on the busbar case 51, and fastened with the fastening bolts 18 by pressing the upper lashing plate 16 and the lower lashing plate 17 to a predetermined dimension.

Since the length of the narrow terminal insertion hole 54 in the laminating direction is roughly the same size as the cell-exterior terminal 24, the cell-exterior terminal 24 inserted into the narrow terminal insertion hole 54 will not move before and after pressing; that is, because it will be positioned as a reference cell, there is an advantage in that the wobbling of the busbar case 51 can be prevented, and the busbar case 51 can thereby be handled more easily.

Even in cases where only one of the terminal insertion holes 53 is small as shown in FIG. 8, if pitch A before pressing changes to pitch B after pressing, as described above, since the secondary battery 2 which is separated G cells worth from the reference cell will become displaced after pressing to the center side of the laminating direction in an amount of (A−B)×G, the sum of the gaps on either end of the module 61 outside the cell-exterior terminals 24 of the terminus secondary batteries 2 in the laminating direction will be (A−B)×(N−1) or more. By causing the distance M of the secondary batteries 2 on either end of the laminating direction and the terminal insertion holes 53 and the terminals to be (A−B)×(N−1) or more, the cell-exterior terminals 24 can be fitted into the terminal insertion holes 53 both before and after pressing, and realized is a structure which will enable the use of the foregoing production method.

Note that one terminal insertion hole 53 having a different diameter in the laminating direction may be used as in this Example, or the diameter may be continuously changed along the laminating direction. For example, the diameter of the terminal insertion holes 53 in the laminating direction may be increased toward the outside of the laminating direction, and decreased toward the inside of the laminating direction.

Example 3

Example 3 is an example of the secondary battery module 1 in which the secondary batteries 2 are consolidated into one row.

Figure 11:
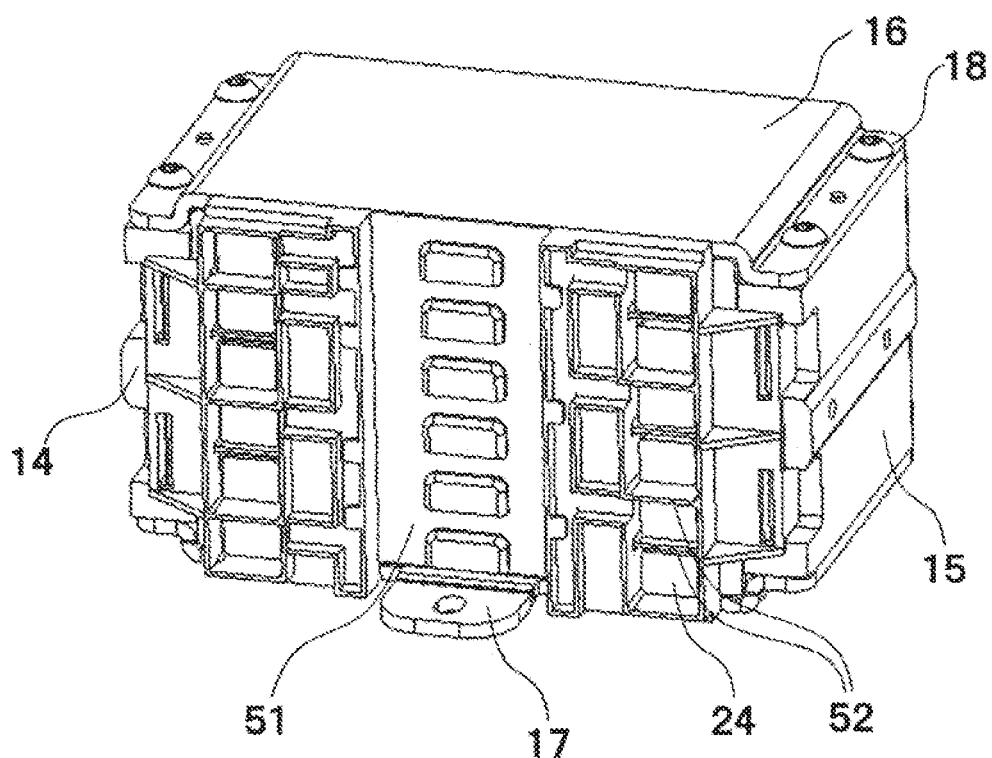
FIG. 11 is an external perspective view of the module.

FIG. 11 is a diagram showing the secondary battery module 1 of Example 3.

The secondary battery module 1 is a module in which six secondary batteries 2 are consolidated into one row. While the previous Examples illustrated a module in which six secondary batteries 2 were consolidated into two rows, the secondary batteries 2 can be easily aligned even with one row by inserting the cell-exterior terminals 24 between the partitions 52 provided to the busbar case 51 before pressing.

Example 4

Figure 12:
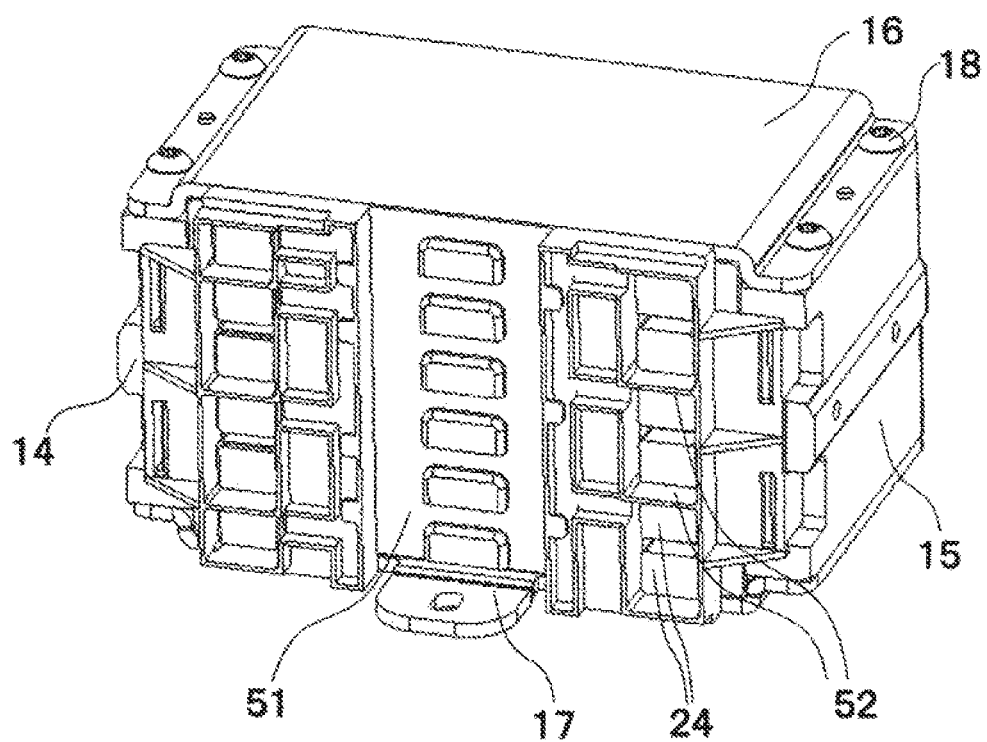
FIG. 12 is a diagram showing the busbar case in which up to two terminals can be inserted into the terminal insertion hole.
Figure 13:
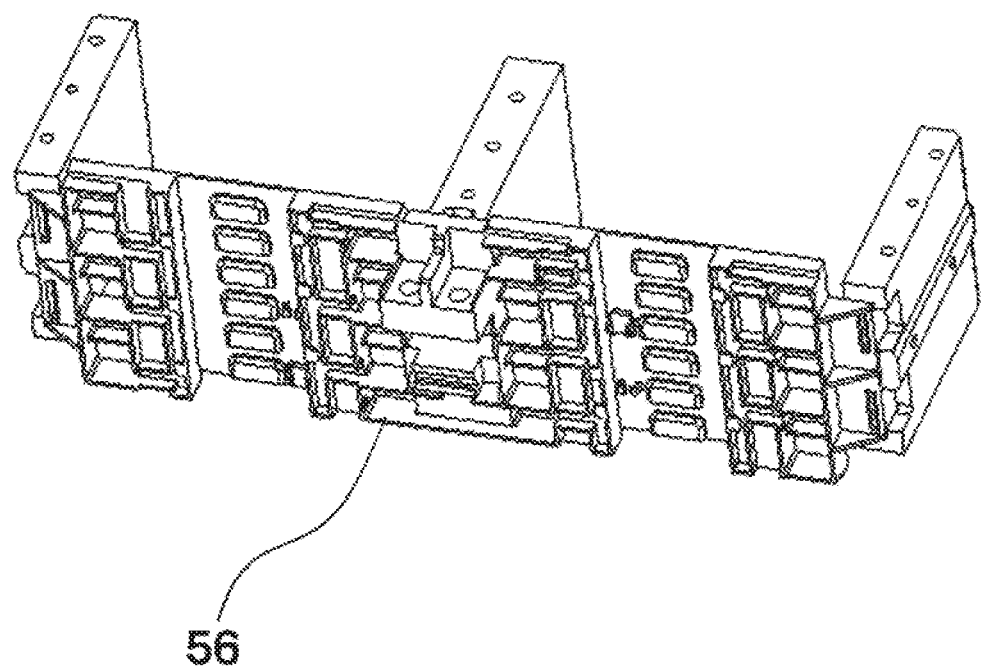
FIG. 13 is a diagram showing the busbar case comprising block members.

Example 4 is a structure in which, in Example 3, the number of partitions 52 of the busbar case 51 is few, and two cell-exterior terminals 24 are inserted between adjacent partitions 52. FIG. 12 is a perspective view of the secondary battery module 1 of Example 4. Since the two cell-exterior terminals 24 to be inserted into one terminal insertion hole 53 are both connected to the busbar 31 in the subsequent step, they do not need to be insulated with the partition 52. It is thereby possible to improve the freedom of design of the busbar case 51.

The terminal insertion holes 53 may be provided where the respective terminals of the secondary batteries, which are adjacent in the laminating direction of the secondary batteries, are considered a pair as in this Example, or may be provided for each terminal as in Examples 1, 2 and 3. Note that a structure as in this Example where the number of partitions 52 is few can also be adopted in the secondary battery module of a plurality of rows as in Examples 1 and 2.

Example 5

Example 5 is an example in which, in Example 1, the busbar case 51 and the first block member 13, the second block member 14, and the third block member 15 are formed integrally. A busbar case 56 with block members can be formed by integrally molding the busbar case 51, the first block member 13, the second block member 14, and the third block member 15, for example, with resin. The foregoing integral molding will contribute to the reduction in the number of components and cost reduction. Moreover, by guiding the block members in the width direction upon inserting the cell-exterior terminals 24 of the secondary batteries 2, it is possible to further improve the ease of assembly.

REFERENCE SIGNS LIST 1 secondary battery module
2 secondary battery
3 positive terminal
4 negative terminal
11 first battery group (secondary battery laminate)
12 second battery group (secondary battery laminate)
13 first block member
14 second block member
15 third block member
16 upper lashing plate
17 lower lashing plate
18 fastening bolt
22 two-sided protrusive insulating plate
23 one-sided protrusive insulating plate
24 cell-exterior terminal (positive terminal 3 or negative terminal 4)
31 busbar
51 busbar case
52 partition
53 terminal insertion hole
54 narrow terminal insertion hole
55 wide terminal insertion hole
56 busbar case with block members
61 gap

The invention claimed is:

1. A secondary battery module, comprising:
a secondary battery having a wide surface and a narrow surface, and a terminal provided protruding from the narrow surface;
a secondary battery laminate in which a plurality of the secondary batteries are laminated so that the wide surfaces are caused to face each other and the terminals are oriented toward one side; and
a busbar case provided so as to face a side on which the terminals of the secondary battery laminate are provided, wherein
the busbar case has holes at positions respectively corresponding to the terminals;
each of the terminals is inserted into one of the holes; and
a length M, which is a sum in the laminating direction, of a gap E, which is a gap on an outside relative to the laminating direction among gaps between the secondary batteries and inner walls of the holes and which are provided on one end of the secondary batteries in the laminating direction, and a gap F, which is a gap on an outside relative to the laminating direction among gaps between the secondary batteries and inner walls of the holes which are provided on another end of the secondary batteries in the laminating direction, satisfies Formula (1) below:

$$M > (A-B) \times (N-1) \qquad \text{Formula(1)},$$

wherein A is a length from an end of one side of the terminal of the secondary battery, in a state in which the secondary battery laminate has not been pressed, in the laminating direction, to one side of the terminal of the adjacent secondary battery in the laminating direction, B is a length from an end of one side of the terminal of the secondary battery, in a state in which the secondary battery laminate has been pressed from both sides in the laminating direction, to one side of the terminal of the adjacent secondary battery in the laminating direction, and the relation satisfies A>B, where N is the number of the secondary batteries in the laminating direction,
wherein the holes are provided in sections where the respective terminals of the secondary batteries which are adjacent at least in the laminating direction are considered a pair,
the plurality of holes differ in size depending on the laminating direction, and
one pair of lashing plates is provided on either end of the secondary battery laminate in the laminating direction;
the one pair of lashing plates is connected via a cell block provided so as to face the narrow surface of the secondary battery; and
the secondary battery laminate is lashed in a state of being pressed in the laminating direction.

2. The secondary battery module according to claim 1, wherein:
the plurality of holes have a same length in the laminating direction; and
gaps provided on an outside relative to the holes and the terminals in the laminating direction differ in size depending on location along the laminating direction.

3. The secondary battery module according to claim 2, wherein:
   a size of the gaps increases from an inside of the laminating direction toward an outside of the laminating direction.

4. The secondary battery module according to claim 1, wherein:
   the secondary battery laminate is provided in a plurality of rows; and
   the cell block is provided between the plurality of secondary batteries laminates.

5. The secondary battery module according to claim 4, wherein:
   the cell block and the busbar case are formed integrally.

6. A method of producing the secondary battery module of claim 1, the method comprising:
   an arrangement step of arranging the plurality of secondary batteries in a protruding manner, in a cell holder; and
   a pressing step of pressing the plurality of secondary batteries in the laminating direction after the arrangement step, wherein:
   in the arrangement step, the terminals of the plurality of secondary batteries are inserted into the holes of the busbar case.

* * * * *